United States Patent
Niedert et al.

(10) Patent No.: US 11,589,443 B1
(45) Date of Patent: Feb. 21, 2023

(54) AUTOMATIC DRIVE MODE LIGHTING SYSTEMS AND METHODS

(71) Applicant: Ford Global Technologies, LLC, Dearborn, MI (US)

(72) Inventors: Andrew Niedert, New Hudson, MI (US); Christopher Berchin, Dearborn, MI (US); Nicholas Scheufler, Flat Rock, MI (US); Seth Goslawski, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/496,954

(22) Filed: Oct. 8, 2021

(51) Int. Cl.
| | |
|---|---|
| *H05B 47/11* | (2020.01) |
| *B60Q 1/32* | (2006.01) |
| *B60Q 1/18* | (2006.01) |
| *B60R 1/12* | (2006.01) |
| *B60Q 1/26* | (2006.01) |
| *H04N 5/235* | (2006.01) |

(52) U.S. Cl.
CPC .............. *H05B 47/11* (2020.01); *B60Q 1/18* (2013.01); *B60Q 1/2603* (2013.01); *B60Q 1/32* (2013.01); *B60R 1/1207* (2013.01); *B60R 2001/1223* (2013.01); *H04N 5/2353* (2013.01)

(58) Field of Classification Search
CPC ........ H05B 47/11; B60Q 1/18; B60Q 1/2603; B60Q 1/32; B60R 1/1207; B60R 2001/1223; H04N 5/2353
See application file for complete search history.

(56) References Cited

U.S. PATENT DOCUMENTS

| | | | |
|---|---|---|---|
| 9,555,803 B2* | 1/2017 | Pawlicki | G08G 1/16 |
| 9,649,974 B1* | 5/2017 | Arumugasamy | B60Q 1/143 |
| 9,931,974 B2 | 4/2018 | Seitz et al. | |
| 2008/0091343 A1* | 4/2008 | Hill | G01C 21/00 |
| | | | 701/408 |
| 2016/0257308 A1* | 9/2016 | Pawlicki | B60W 30/12 |
| 2017/0214746 A1* | 7/2017 | Zettler | H04L 67/12 |
| 2018/0340673 A1* | 11/2018 | Herrmann | B60Q 1/2696 |
| 2019/0118625 A1* | 4/2019 | Tate | B60J 5/0472 |
| 2021/0166564 A1* | 6/2021 | Takaki | G08G 1/167 |
| 2021/0213870 A1* | 7/2021 | Martin | B60Q 1/143 |

(Continued)

FOREIGN PATENT DOCUMENTS

DE 102019003112 A1 5/2020

OTHER PUBLICATIONS

Nissan Motor Corporation, "Intelligent Auto Headlights", Nissan Car Technology, five pages.

(Continued)

*Primary Examiner* — Abdullah A Riyami
*Assistant Examiner* — Syed M Kaiser
(74) *Attorney, Agent, or Firm* — Frank Lollo; Eversheds Sutherland (US) LLP

(57) ABSTRACT

Automatic drive mode lighting systems and methods are disclosed herein. An example method can include determining when a drive mode of a vehicle is an off-road mode, determining when a speed of the vehicle is below a speed threshold, determining when a location of the vehicle corresponds to an off-road location, and automatically activating off-road lighting for the vehicle when the drive mode is in an off-road mode, the speed is below the speed threshold, and the location corresponds to an off-road location.

19 Claims, 6 Drawing Sheets

(56) References Cited

U.S. PATENT DOCUMENTS

2021/0402918 A1* 12/2021 Demski ................ B60Q 1/0088
2022/0041109 A1* 2/2022 Contreras Sosa ..... B60R 1/1207
2022/0042672 A1* 2/2022 Raring ................ H01S 5/02251

OTHER PUBLICATIONS

Ford Media Center, "All-New Ford Bronco Sport Rugged SUV Equipped For Trails With Standard 4X4 And Built Wild Capability And Confidence", Ford, Dearborn, MI, Jul. 13, 2020, five pages.
Land Rover, "Range Rover Sport", Land Rover Above & Beyond, 72 pages.

* cited by examiner

AUTOMATIC DRIVE MODE LIGHTING SYSTEMS AND METHODS

BACKGROUND

Many vehicles are increasingly being sold with some form of selectable drive mode. Many of these modes include off road modes, which may encourage the user to drive the vehicle in many situations other than on a regular road or highway.

For off-road vehicles, one of the lures of owning that vehicle is being able to drive the vehicle on trails at night. Some off-road vehicle owners seek trail use at night. Some drivers may underestimate how long it takes to progress through a tough trail and find themselves on the trail in low-light situations. Being unable to see in this situation can lead to the driver getting stuck or striking large objects on the trail (to the side of the vehicle). Furthermore, in tough driving situations, the driver may feel uncomfortable removing their hands to manually turn the lights on.

For towing vehicles, launching or docking a boat in the dark may be difficult and cause anxiety. The inability to see the water line while backing up can lead to submersion of the rear of the vehicle. For vehicles with 360-degree view cameras, camera usefulness may be diminished when driving at night (even though the cameras can be used while driving in certain drive modes).

BRIEF DESCRIPTION OF THE DRAWINGS

A detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1A:
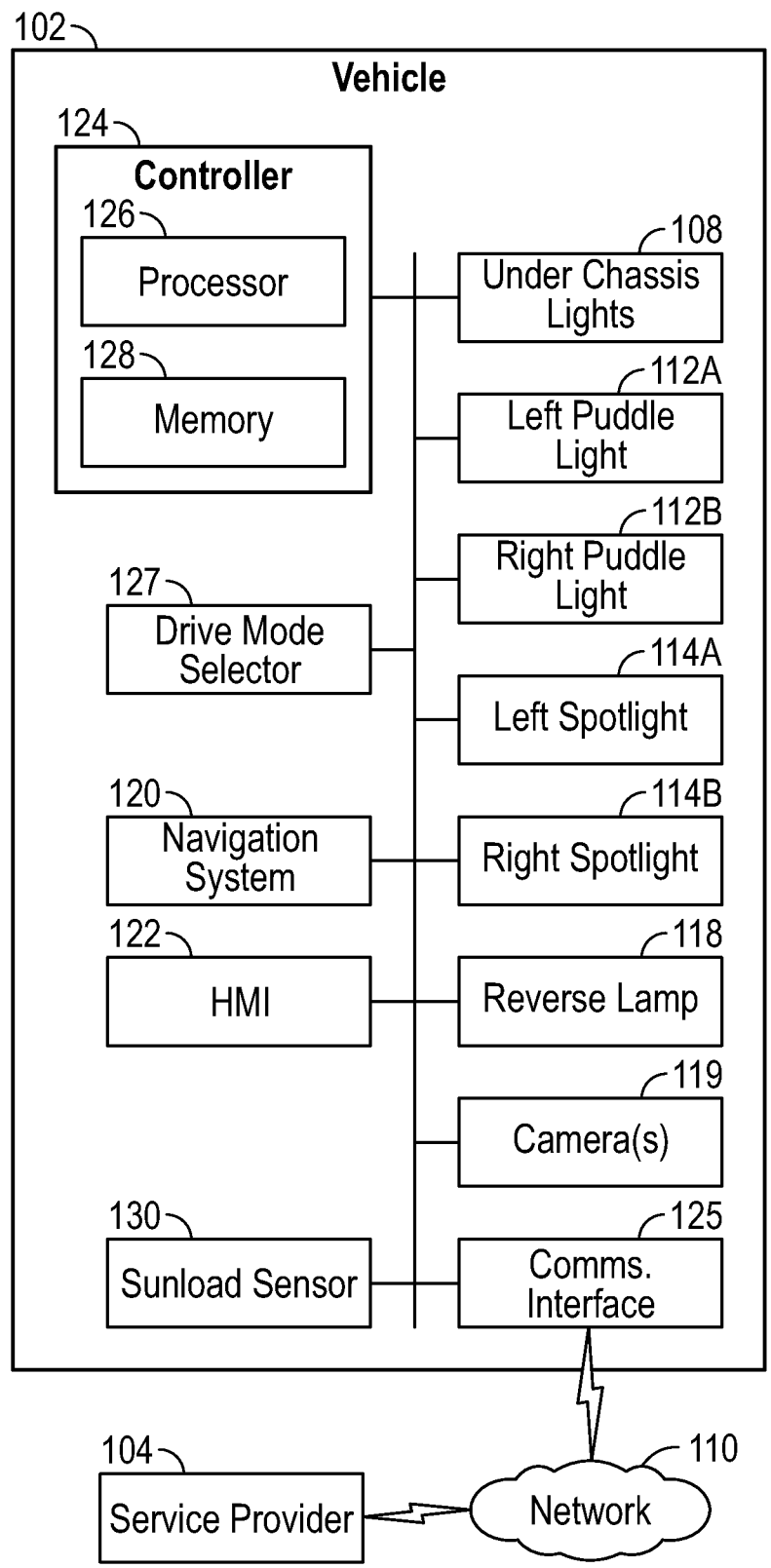
FIGS. 1A and 1B collectively illustrate an example architecture where the systems and method of the present disclosure may be practiced.

The present disclosure pertains to systems and methods for automatic drive mode lighting management. An example system provides a lighting solution during times when the vehicle is in a selected drive mode. For example, the vehicle may be in a trail mode, rock crawl mode, or another similar off-roading mode. For purposes of brevity and clarity, the present disclosure will refer to this in general as the vehicle being in an off-road mode. In the rock crawl or hill climb mode, lights under the chassis of the vehicle may be activated to allow a driver or other user to see underneath the vehicle. Other lights located on a front, top, side, or vehicle mirror may also be activated.

In addition to the automatic activation of lighting during specific drive modes, lighting can also be activated when the vehicle is performing certain maneuvers, such as when the vehicle is rock crawling or backing up a trailer. Thus, the present disclosure is not limited to instances where the vehicle is placed in a particular drive mode, but also when certain criteria are met that indicate that the vehicle is in an off-road scenario or another related mode such as boat launch/recovery. In one example, off-road lights may be activated when the driver has not placed the vehicle in an off-road mode, but a controller of the vehicle determines that the vehicle is experiencing driving conditions that are indicative of the vehicle being used off-road.

When the vehicle is in the off-road mode, a system or method of the present disclosure may be used to automatically turn on a lighting apparatus or device of the vehicle. In some instances, other criteria may be met before automatically activating the lighting apparatus. For example, the vehicle may be in the off-road mode, and the vehicle is driving under a threshold speed, such as 20 mph. In some instances, the automatic activation of the lighting apparatus can be based, in whole or in part, by determining that the vehicle is off-road. This can include verifying that the vehicle is off-road based on GPS (Global Positioning System) or trail navigation system data.

The systems and methods can use sunlight sensor(s) and calibrations to automatically illuminate puddle and spot lamps in vehicle mirrors. This may provide the driver and passenger increased visibility to the side of the vehicle and decrease the chance of the driver striking a large rock or obstacle on the trail. Additionally, in this mode, a view from a 360-degree camera of the vehicle can be displayed on the main infotainment screen. By allowing the puddle and spot lamps to be illuminated, the side view of the 360-degree camera system may be more useful.

In an example scenario of a boat launch (as opposed to an off-road driving situation). GPS data could be used to confirm the customer is at a boat launch area, and the sunlight sensor could be used to confirm low-light situations. Equipped reverse lights or lighting elements from zone lighting features can be used to increase visibility in the reverse camera of the vehicle. These features may also be provided to a vehicle through remote software updates.

Illustrative Embodiments

Figure 1B:
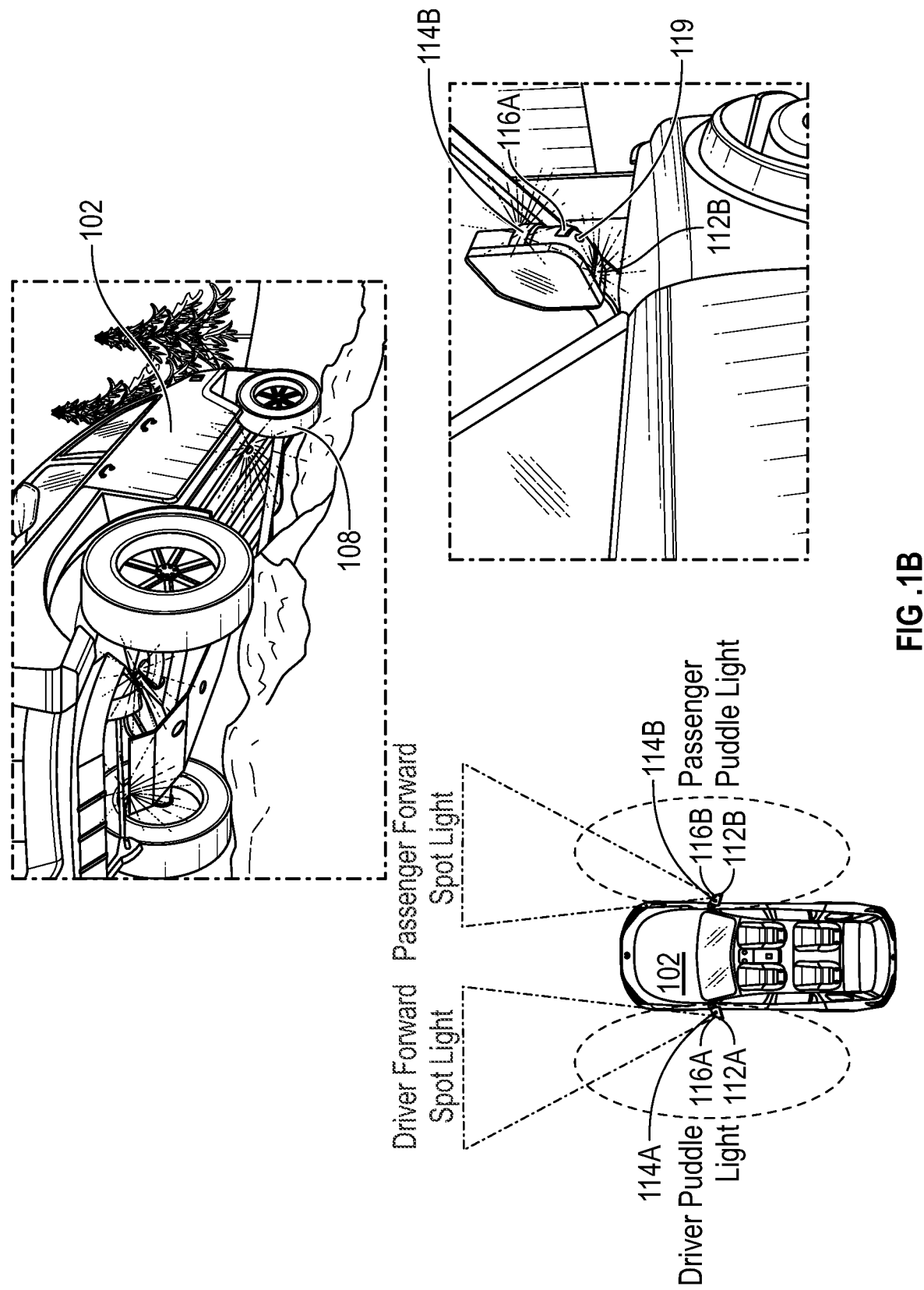

Turning now to the drawings. FIG. 1 depicts an illustrative architecture 100 in which techniques and structures of the present disclosure may be implemented. The architecture 100 includes a vehicle 102, a service provider. 104, and a network 106. Some or all of these components in the architecture 100 can communicate with one another using the network 106. The network 106 can include combinations of networks that enable the components in the architecture 100 to communicate with one another. The network 106 may include any one or a combination of multiple different types of networks, such as cellular, cable, the Internet, wireless networks, and other private and/or public networks. In some instances, the network 106 may include Wi-Fi or Wi-Fi direct. The components of the architecture 100 can also communicate over short-range or radiofrequency links such as BLUETOOTH or ultra-wideband (UWB).

The vehicle 102 can include any off-road capable vehicle, such as a truck or sport utility vehicle. The vehicle 102 can comprise various lights or lighting apparatuses such as under-chassis lighting 108. The under-chassis lighting 108 can illuminate an area underneath the vehicle 102. For example, the under-chassis lighting 108 can provide light underneath the vehicle when the vehicle is operating a rock crawling or other off-road mode. This allows a driver or other individual (or a camera) to view what is underneath the vehicle. When the vehicle has a raised suspension system (common with rock crawling off-road vehicles), the added ground clearance and lighting enhance a view of objects that may be underneath the vehicle.

Additionally, the vehicle can be equipped with standard front headlights. Off-road lights can also be mounted on both side mirrors of the vehicle. For example, a left puddle light 112A and left forward spotlight 114A can be arranged onto a left side mirror 116A. For example, a right puddle light 112B and right forward spotlight 114B can be arranged onto a right side mirror 116B. The puddle lights illuminate areas around and below the door the vehicle. A puddle lamp can be used for welcome/embrace events or when users (with a key) are approaching the vehicle. A forward spotlight can illuminate an area in front of the vehicle.

In contrast with the headlights and reverse lamps, the under-chassis lighting, puddle lights, and forward spotlights are collectively referred to as off-road lights. In various configurations and use cases, different combinations of these off-road lights can be activated.

Reverse lamps, such as a reverse lamp 118 (e.g., tail light) can light up a rear area of the vehicle. Some vehicles, such as trucks, may be equipped with a light that illuminates a bed of the truck.

The vehicle 102 may be equipped with specific lighting control options, such as zone lighting. In zone lighting, several lighting elements can be turned on by a user. For example, any combination of headlights, mirror spot, mirror puddle, and reverse lights can be activated. However, zone lighting modes may be locked to only function when the vehicle is moving.

In addition to being equipped with various types of lighting apparatuses, the vehicle can include cameras that capture images of the environment around the vehicle 102. For example, each of the side mirrors can also include a camera, such as the camera 119 associated with the right side mirror. Various cameras can be positioned around the vehicle in the front and rear as well. The placement of these cameras varies from vehicle-to-vehicle. Images from these cameras can be combined to create a 360-degree view around the vehicle 102, as will be discussed in greater detail herein.

In some instances, the vehicle 102 can be equipped with an onboard navigation system 120 that can utilize off-road trail maps. The onboard navigation system 120 can be implemented through an infotainment system or other similar human-machine interface (HMI 122).

To allow a user to control and automate the lighting experience as disclosed herein, the vehicle 102 can comprise a controller 124 that automatically activates selected lighting elements in response to the vehicle being in a specific drive mode or when conducting certain maneuvers.

The controller 124 comprises a processor 126 and memory 128 for storing instructions. The processor 126 executes instructions stored in memory 128 to perform any of the methods disclosed herein. In general, the memory 128 can store logic that can determine what mode the vehicle is in (or maneuver is being performed), as well as other logic that allows for activating lights or cameras based on vehicle mode or maneuver. When referring to actions performed by the controller 124, this implicitly involves the execution of instructions by the processor 126. When referring to actions performed by the vehicle 102, this implicitly involves use of the controller 124, depending on the context. In one example, the controller 124 can receive updates to the logic over the network 106 from the service provider 104. In some instances, the vehicle comprises a communications interface 125 that allows the controller 124 to transmit and/or receive data over the network 106.

In use, the controller 124 can be configured to determine an off-road drive mode from an attendant vehicle system. For example, the controller 124 can be coupled to a controller area network (CAN) that provides signals from other vehicle components such as an engine control or powertrain control module. The controller 124 may receive signals through the CAN from the component of the vehicle that allows the driver to select a drive mode. In some instances, the controller 124 receives an indication that a drive mode selector 127 of the vehicle has been placed in an off-road setting.

When an off-road drive mode has been selected, the controller 124 can automatically activate one or more of the lights of the vehicle. For example, the controller 124 can determine that the vehicle is in a first off-road mode, such as a trail mode. The controller 124 can, in response, activate the front headlights, as well as the forward spotlights and puddle lights in the side mirrors of the vehicle. Another set of lights which are similar or different could be activated when the controller 124 determines that the vehicle is in a second off-road mode, such as rock crawl mode. Specific examples regarding rock crawl mode are disclosed with respect to the flow diagram of FIG. 2.

In another example, the controller 124 can predicate the automatic activation of some lights based on other contextual information. For example, the controller 124 can determine that a speed of the vehicle is below a threshold speed. In one example, the controller 124 can receive vehicle velocity data from an engine control module and compare the vehicle velocity to a threshold, such as 20 mph (other threshold values can be used). If the vehicle speed is below the threshold and the vehicle is in an off-road drive mode, the controller 124 can activate a selected combination of vehicle lights. The lights selected could be any combination of the lights disclosed herein.

In yet another example, the controller 124 can automatically activate vehicle lights when the vehicle is determined to be in an off-road mode, is operating at a speed that is below the threshold, and is confirmed as being in a designated off-road area. The controller 124 can determine that the vehicle is in a designated off-road area based on information obtained from the navigation system 120. As noted above, the navigation system 120 can maintain particularized off-road maps. In another example, when the navigation system 120 does not possess these off-road maps, the controller 124 can infer that the vehicle is in an off-road area when the vehicle is being operated in an area where a designated road is not included on the navigation map. When all these criteria are met, the controller 124 can activate a selected number of the vehicle lights. Again, the lights selected by the controller 124 can be based on the vehicle operating context. The driver can also manually adjust which lights are operational through the HMI 122 or another pertinent light controller/actuator. For example, there may be dials or switches located in the vehicle cabin that allows the driver to turn lights on/off, or adjust the brightness thereof.

The controller 124 can further predicate the automatic activation of vehicle lights based on data obtained from a sunload sensor 130. The sunload sensor 130 can be positioned anywhere on the vehicle, but in an area that is exposed to ambient sunlight. The sunload sensor 130 detects an amount of natural sunlight around the vehicle. The controller 124 can determine a relative lightness or darkness of the area around the vehicle, and activate vehicle lights when the sunlight is at or below a sunlight threshold. For example, the controller 124 may activate vehicle lights when the sunlight falls below five lux (for reference, dawn and dusk are values below one lux, however other threshold values can be used). When the sunload sensor is used, the data from the sunload sensor can be used to prevent automatic activation of vehicle lights when ambient lighting conditions indicate that sufficient ambient sunlight exists.

Conversely, the automatic activation of lights can also occur when certain vehicle maneuvers are being attempted. For example, when the vehicle is connected to a trailer and the vehicle is being used to back a boat into the water, certain lights can be activated to support the backing of the trailer into the water. This could include activating puddle lamps in the side mirrors when the vehicle is in reverse and the controller 124 determines that a trailer is connected to the vehicle (again, these data could be provided through the vehicle CAN).

The controller could also automatically activate vehicle lights associated with rock crawling activities when gyroscopic data obtained from an onboard gyroscope indicate that the vehicle is being operated on very uneven terrain. What constitutes uneven terrain may vary from circumstance to circumstance, but in one example, when an angle of one or more quadrants of the vehicle are elevated above a threshold value relative to other vehicle quadrants, the controller 124 may infer that the vehicle is being used in a rock crawling or other off-road maneuver. For example, if the front right quadrant of the vehicle is elevated, but other quadrants are either slightly elevated or not elevated at all, the vehicle is may be in an off-road maneuver. In some instances, certain patterns of the shifting of a center of gravity of the vehicle (tracked by a gyroscope) may indicate that the vehicle may be in an off-road maneuver or on an off-road trail. In addition to vehicle maneuver information, other criteria can be used to activate lights as well, such as ambient lighting conditions, navigation map data, and the like.

In addition to activating lights, the controller 124 can be configured to activate and/or adjust the field of view of the 360-degree cameras, or other cameras, of the vehicle. For example, when in the rock crawl mode, the controller 124 can adjust the field of view of cameras on the side mirrors outwardly to gain a better view of objects that are positioned laterally to the vehicle. Other similar camera and/or light adjustments may also occur on an as-needed basis, in view of the drive mode that has been selected. The output of a light can also be adjusted based on factors such as ambient light. For example, the lumens emitted by lights on the side mirrors may be increased during times such as dusk and dawn, and reduced when the vehicle is in complete darkness. In another example, the controller 124 can selectively adjust a field of view and/or the operation of the camera based on changes in luminosity of the off-road lighting. For example, as luminosity increases, so can the exposure rate or setting of the camera.

Figure 2:
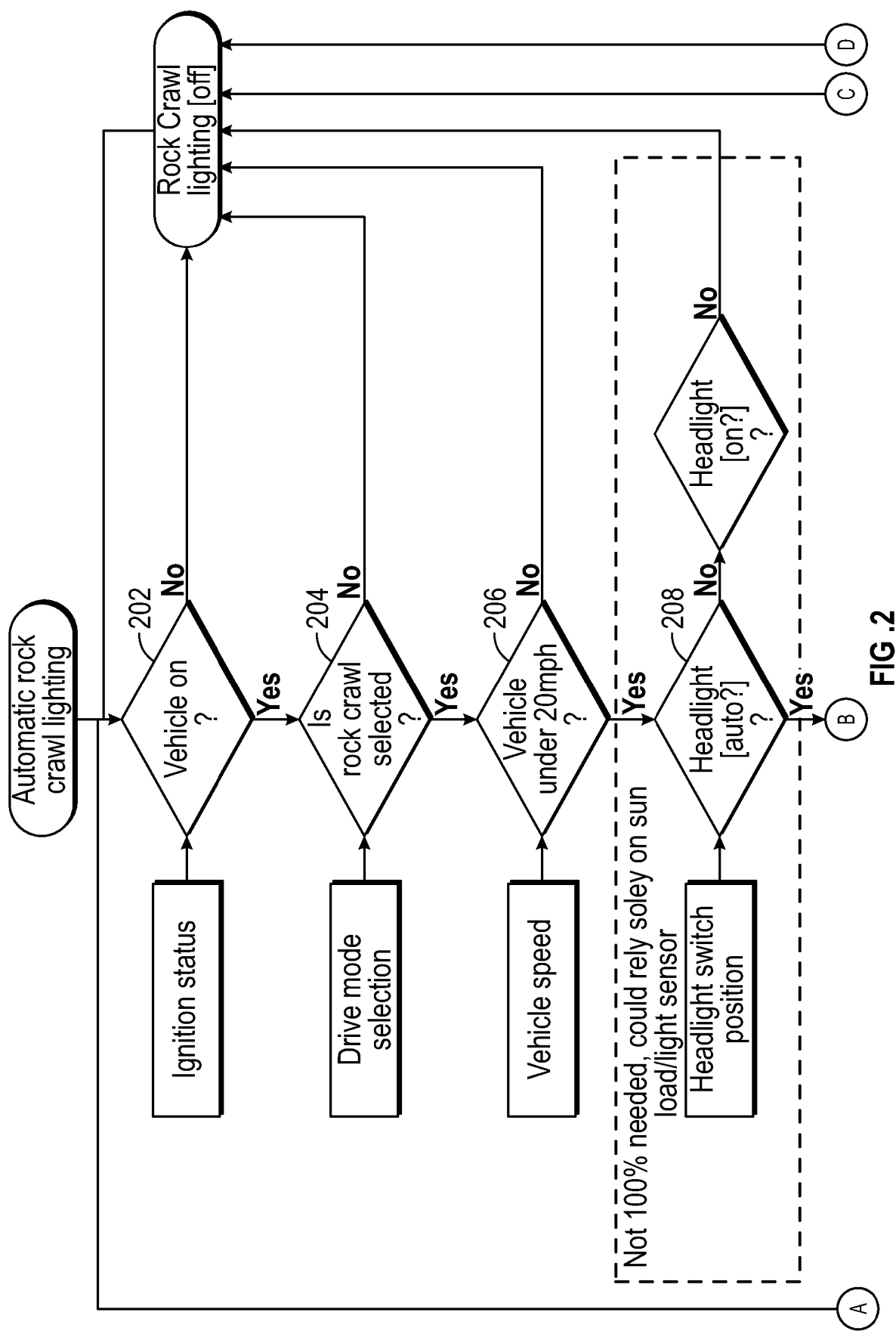
FIG. 2 is a flowchart of an example method of the present disclosure for activating off-road lights in response to the vehicle being in a rock crawl mode.
Figure 2:
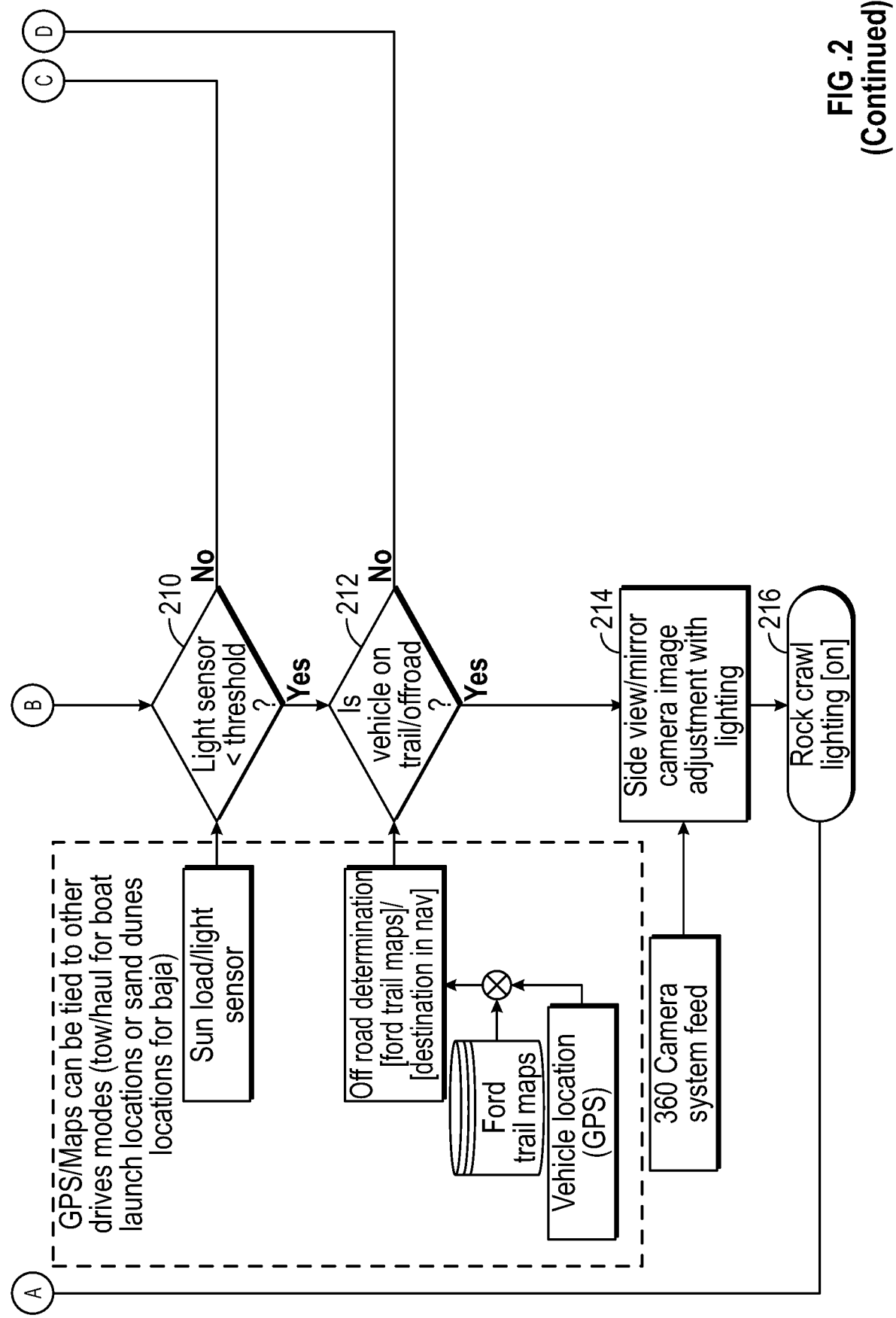

FIG. 2 is a flowchart of an example process for activating vehicle lights, namely for rock crawling. This method may be performed by a controller as disclosed herein. In step 202, a determination is made as to whether the vehicle ignition is on or off. An ignition status signal can be transmitting on the CAN and received by the controller. It will be understood that lights may be activated when the vehicle ignition is on (and in some instances, when the engine is running). Lights may be turned back on after key cycles when rock crawl mode has been selected as discussed below.

If the ignition status is off, rock crawl lights remain off. If the ignition status is on, the method includes a step 204 of determining if a rock crawl mode has been selected by the driver. A drive mode selection signal can be transmitted on the CAN and received by the controller. If the drive mode selection indicates that "rock crawl" has not been selected, rock crawl lights remain off. If the drive mode selection indicates that "rock crawl" has been selected, the method progresses to step 206 of determining if the vehicle speed is at or below the vehicle speed threshold, which in this example is 20 mph. If the vehicle speed is above 20 mph, rock crawl lights may remain off. However, the controller that determines if the vehicle speed is above or below the vehicle speed threshold may also be configured to account for hysteresis in vehicle speed. For example, lights may be turned off above 20 mph, but as soon as the vehicle speed drops below 20 mph, the lights would come back on automatically, assuming the vehicle drive mode is rock crawl. Vehicle speed signals can also be obtained by the controller from the CAN.

The method can include a step 208 of determining if the headlights of the vehicle have been activated by the driver or not. This determination can be made by the controller determining a headlight switch position. That is, the vehicle can include a headlight switch or other toggle/actuator in the vehicle cabin. The driver can manually activate or deactivate the headlights of the vehicle using this component. It will be understood that many vehicles have headlight switches that are always in the on position or are set to automatically activate at certain times of the day. Thus, the controller can utilize signals from the sunload sensor rather than, or in addition to, relying on signals from the headlight switch. Thus, the method can include a step 210 of determining if ambient light received by the sunload (sunlight) sensor is at or below a sunlight threshold. For example, if sunlight is at or above three lux, the rock crawl lights may be set to an off setting. When the sunlight is at or below three lux, the method can progress to step 212 of determining if the vehicle is in an off-road location. The controller can determine when the vehicle is in an off-road location based on off-road map data obtained from a navigation system. Again, the vehicle can possess specialize trail or off-roading maps that assist the controller in determining when the vehicle is in an off-road location, compared to navigation maps that do not possess these data. When the vehicle is determined not to be on an off-road trail, the rock crawl lights remain off. It will be understood that in some instances, the use of off-road maps may not control activation of rock crawl lights when other criteria (such as those pertaining to steps 202-208 indicate that the vehicle is likely in an off-road mode or conducting an off-road maneuver).

In step 214, the method can include selectively adjusting a field of view of one or more cameras used to create a 360-degree view. The controller can obtain a 360-degree camera feed from various camera inputs and adjust the same based on the drive mode. In some instances, parameters of lights can also be adjusted, such as light directionality. For example, side mirror lighting can be used to illuminate areas where side-mounted cameras are directed. Exposure settings for the cameras can be adjusted to take advantage of the additional lighting provided by the lights on the side mirrors. In another example, the controller can activate specific light emitting diode (LED) lights and/or infrared (IR) elements to enhance night vision capabilities (if cameras are configured for night vision).

The method can include a step 216 of automatically activating rock craw lighting. As noted above, the rock crawl lighting can be activated when fewer steps are performed. For example, lighting can be activated based on step 204 indicating that rock crawl mode has been activated. In another example, lighting can be activated based on step 204 indicating that rock crawl mode has been activated and step 206 indicating that vehicle speed is below the speed threshold. In one example, lighting can be activated based on step 204 indicating that rock crawl mode has been activated, step 206 indicating that vehicle speed is below the speed threshold, and step 210 indicating that ambient sunlight is below a sunlight threshold value (can be measured in lux), and/or step 212 indicating that the vehicle is in an off-road location.

Figure 3:
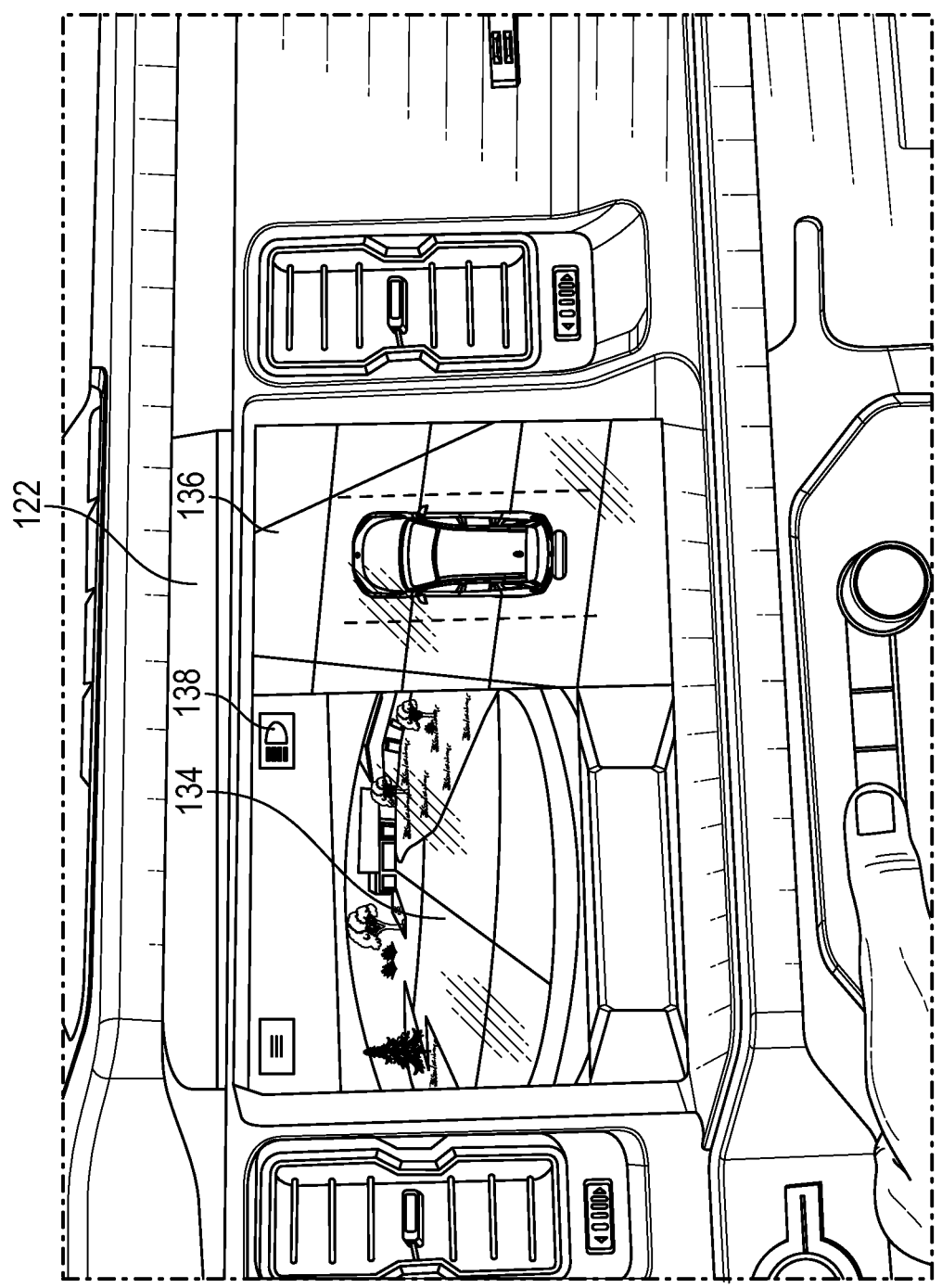
FIG. 3 is a perspective view of an example human-machine interface with related content being displayed thereon.

FIG. 3 illustrates the HMI 122 of FIG. 1 in greater detail. The HMI 122 includes a display 132 that presents one or more camera views 134 and 136. The display 132 can include a virtual button 138 or actuator that can be used by a driver or passenger to activate rock crawling lights. The HMI 122 may present this virtual button 138 when the vehicle has been placed into an off-road mode, such as rock crawl. The virtual button 138 may persist on the display 132 in all camera views when the vehicle is in the off-road mode. Thus, while the vehicle lighting can be automatically activated by a controller as disclosed above, the virtual button allows a user to manually activate or deactivate the rock crawl lighting.

A position of the virtual button 138 can be based on a preferred visibility of the driver. When the virtual button 138 is located as illustrated, such a position gives equal access to the front passenger which would be useful the event the driver is occupied with intensive driving maneuvers.

Figure 4:
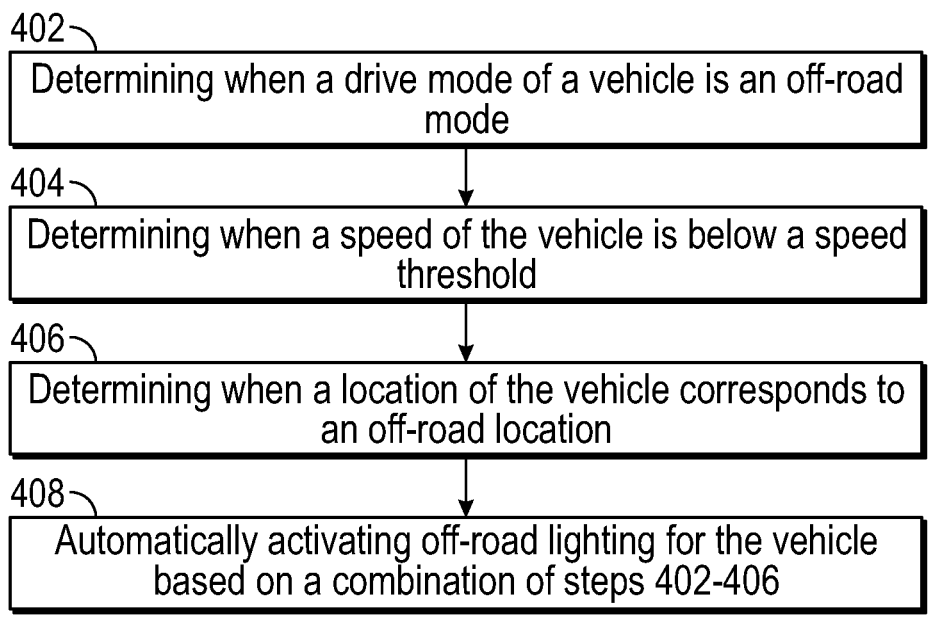
FIG. 4 is a flowchart of another example method of the present disclosure.

FIG. 4 is a flowchart of an example method. The method can include a step 402 of determining when a drive mode of a vehicle is an off-road mode. For example, a signal can be received from a drive mode selector of the vehicle. In one instance, the drive mode selector is a radial control selector that a user can turn to select their preferred drive mode. In another example, the user can select a drive mode through a graphical user interface (GUI) presented through an infotainment system of the vehicle. In some instances, the drive mode corresponds to a rock crawl mode, but other off-road modes can be selected.

The method can also include a step 404 of determining when a speed of the vehicle is below a speed threshold. For example, data or a signal can be obtained from an engine control module that indicates a current speed of the vehicle. A controller can compare the current vehicle speed to a speed threshold. In one example, the speed threshold can be 10 mph.

The method can also include a step 406 of determining when a location of the vehicle corresponds to an off-road location. As noted above, the vehicle can implement a navigation system that can include specialized off-road trail maps. GPS signals indicative of a current location of the vehicle can be obtained using a GPS module onboard the vehicle. The controller can compare the current vehicle location (in terms of latitude and longitude) to map locations of off-road trails. When the vehicle is on or near an off-road trail, the controller can infer or directly determine that the vehicle is located on or near an off-road trail. The off-road location can be determined based on a navigation map that comprises off-road trail maps, or a standard map. The vehicle can be inferred to be off-road when operating in an area that is not a designated on a map as a road.

Based on a combination of the determinations of steps 402-406, which may include all or a subset of the determinations being met, the method can include a step 408 of automatically activating off-road lighting for the vehicle. For example, off-road lighting may be activated when the drive mode is in an off-road mode, the speed is below the speed threshold, and the location corresponds to an off-road location.

As noted, the off-road lighting can include any of under-chassis lights, a puddle light associated with a side mirror of the vehicle, and a forward spotlight associated with the side mirror of the vehicle. In one use case, such as when the drive mode corresponds to a rock crawl mode, the controller selects the under-chassis lights, the puddle light, and the forward spotlight.

In general, the automatic activation of the off-road lighting can be based on the drive mode that is selected. While all available lights may be selected when in rock craw mode, a subset of lights may be selected for other operating modes such as Baja/sand mode, trail mode, or when backing a trailer down a boat ramp. Each of these individual modes may involve unique lighting needs.

Figure 5:
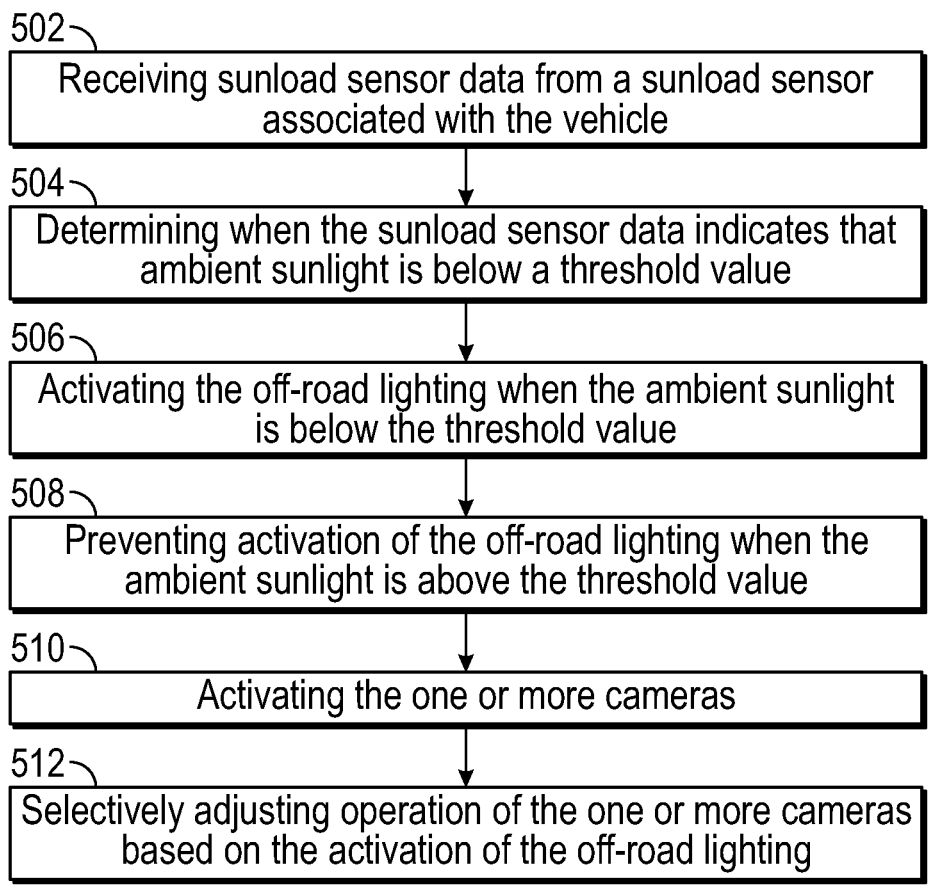
FIG. 5 is a flowchart of yet another example method of the present disclosure.

FIG. 5 is a flowchart of a method that is related to the method of FIG. 4. That is, the method illustrated in FIG. 5 can be used in combination with the method of FIG. 4. The method can include a step 502 of receiving sunload sensor data from a sunload sensor associated with the vehicle.

The method can include a step 504 of determining when the sunload sensor data indicates that ambient sunlight is below a threshold value. For example, the controller can compare the signals or data obtained from the sunload sensor to a threshold sunlight value. In one use case, the ambient sunlight value that is measured is 15 lux, whereas the threshold sunlight value is two lux. Thus, the off-road lighting may not be activated. When the ambient sunlight value drops below two lux, the off-road lighting may be activated. Thus, the sunload value may override other parameters. For example, even if the vehicle is in an off-road mode and is below the speed threshold, the controller may not activate the off-road lighting due to the high amount of ambient light available. The user can override this by activating the off-road lighting manually through the HMI of the vehicle.

The method includes a step 506 of activating the off-road lighting when the ambient sunlight is below the threshold value, as well as a related step 508 of preventing activation of the off-road lighting when the ambient sunlight is above the threshold value.

The method can also include a process of providing a 360-degree view around the vehicle based on images obtained from one or more cameras. This process can include a step 510 of activating the one or more cameras. These cameras are located around the periphery of the vehicle and include unique and/or overlapping fields of view. These images obtained across multiple cameras can be used to create the 360-degree view.

Next, the method can include a step 512 of selectively adjusting operation of the one or more cameras based on the activation of the off-road lighting. For example, this can include selectively adjusting an exposure setting or a field of view of the operation of the camera based on changes in luminosity of the off-road lighting.

Implementations of the systems, apparatuses, devices and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of functions. An implementation of the devices, systems and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims may not necessarily be limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can." "could," "might." or "may." unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method comprising:
   determining that a drive mode of a vehicle is a first off-road mode;
   determining that a speed of the vehicle is below a speed threshold;
   determining that a location of the vehicle corresponds to an off-road location;
   automatically activating first off-road lighting for the vehicle when the drive mode is in the first off-road mode, the speed is below the speed threshold, and the location corresponds to the off-road location, wherein the first off-road lighting includes at least one of: a puddle light and/or a forward spotlight associated with side mirrors of the vehicle;
   determining that a drive mode of a vehicle is a second off-road mode; and
   automatically activating second off-road lighting for the vehicle when the drive mode is in the second off-road mode.

2. The method according to claim 1, wherein the first off-road mode corresponds to a rock crawl mode, wherein determining that the drive mode of the vehicle is the rock crawl mode comprises determining that a first portion of the vehicle is elevated above a threshold value relative to a second portion of the vehicle.

3. The method according to claim 1, wherein the off-road location is determined based on a navigation map that comprises off-road trail maps.

4. The method according to claim 1, further comprising:
   receiving sunload sensor data from a sunload sensor associated with the vehicle; and
   determining when the sunload sensor data indicates that ambient sunlight is below a threshold value,
   wherein the first off-road lighting is activated when the ambient sunlight is below the threshold value, and preventing activation of the first off-road lighting when the ambient sunlight is above the threshold value.

5. The method according to claim 1, further comprising:
   activating a camera located in a side mirror of the vehicle; and
   selectively adjusting operation of the camera based on the activation of the first off-road lighting.

6. The method according to claim 5, wherein selectively adjusting operation of the camera comprises adjusting an exposure setting.

7. The method according to claim 6, further comprising selectively adjusting a field of view of the operation of the camera based on changes in luminosity of the first off-road lighting.

8. A vehicle comprising:
   first off-road lighting and second off-road lighting; and
   a controller comprising a processor and memory, the processor executing instructions stored in the memory to:
   determine when a drive mode of the vehicle is a first off-road mode;
   determine when a speed of the vehicle is below a speed threshold;
   determine when a location of the vehicle corresponds to an off-road location;
   automatically activate the first off-road lighting for the vehicle when the drive mode is in the first off-road mode, the speed is below the speed threshold, and the location corresponds to the off-road location, wherein the first off-road lighting includes at least one of: a puddle light and/or a forward spotlight associated with side mirrors of the vehicle;
   determine that a drive mode of a vehicle is a second off-road mode; and
   automatically activate the second off-road lighting for the vehicle when the drive mode is in the second off-road mode.

9. The vehicle according to claim 8, further comprising a drive mode selector, wherein the drive mode of the vehicle is based on a selected position of the drive mode selector.

10. The vehicle according to claim 8, wherein the first off-road lighting comprises:
    under-chassis lights;
    a puddle light associated with a side mirror of the vehicle; and
    a forward spotlight associated with the side mirror of the vehicle.

11. The vehicle according to claim 10, wherein when the drive mode corresponds to a rock crawl mode, the controller selects at least one of the under-chassis lights, the puddle light, and the forward spotlight.

12. The vehicle according to claim 10, wherein the controller is configured to select all or a portion of the first off-road lighting based on the drive mode that is selected.

13. The vehicle according to claim 8, further comprising a navigation system that is configured with off-road trail maps, wherein the off-road location is determined based on comparing the location of the vehicle to the off-road trail maps.

14. The vehicle according to claim 8, further comprising a sunload sensor mounted on the vehicle, the sunload sensor measuring an amount of ambient sunlight, wherein the controller is configured to determine when the amount of ambient sunlight is below a threshold value, wherein the first off-road lighting is activated by the controller when the amount of ambient sunlight is below the threshold value, and is not activated by the controller when the amount of ambient sunlight is above the threshold value.

15. The vehicle according to claim 8, further comprising one or more cameras that provide a 360-degree view around the vehicle.

16. A device comprising:
a processor; and
a memory, the processor executing instructions stored in memory to:
determine when a drive mode of a vehicle is a first off-road mode;
determine when a speed of the vehicle is below a speed threshold;
determine when the vehicle is located on an off-road trail;
automatically activate first off-road lighting for the vehicle based on any combination of an ignition of the vehicle being on, the vehicle being in the first off-road mode, the speed being below the speed threshold, and a location of the vehicle corresponding to the off-road trail, wherein the first off-road lighting includes at least one of: a puddle light and/or a forward spotlight associated with side mirrors of the vehicle;
determine that a drive mode of a vehicle is a second off-road mode; and
automatically activate second off-road lighting for the vehicle when the drive mode is in the second off-road mode.

17. The device according to claim 16, wherein the processor is configured to provide a 360-degree view around the vehicle from images obtained from one or more cameras, the processor being configured to:
activate one or more cameras; and
selectively adjust operation of the one or more cameras based on activation of the first off-road lighting by selectively adjusting an exposure setting or a field of view of the camera based on changes in luminosity of the first off-road lighting.

18. The device according to claim 16, wherein the processor is configured to:
receive sunload sensor data from a sunload sensor associated with the vehicle; and
determine when the sunload sensor data indicates that ambient sunlight is below a sunlight threshold;
wherein the first off-road lighting is activated when the ambient sunlight is below the sunlight threshold, and prevent activation of the first off-road lighting when the ambient sunlight is above the sunlight threshold.

19. The device according to claim 16, further comprising receiving signals from a drive mode selector to determine the drive mode.

* * * * *